United States Patent
Eisenhauer et al.

(10) Patent No.: US 9,197,433 B2
(45) Date of Patent: *Nov. 24, 2015

(54) SUPPORTING NON-DELIVERY NOTIFICATION BETWEEN A SWITCH AND DEVICE IN A NETWORK

(75) Inventors: Daniel G. Eisenhauer, Austin, TX (US); Roger Gregory Hathorn, Tucson, AZ (US); Louis William Ricci, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 507 days.

This patent is subject to a terminal disclaimer.

(21) Appl. No.: 13/483,947

(22) Filed: May 30, 2012

(65) Prior Publication Data

US 2012/0236732 A1 Sep. 20, 2012

Related U.S. Application Data

(63) Continuation of application No. 12/508,490, filed on Jul. 23, 2009, now Pat. No. 8,260,960.

(51) Int. Cl.
*H04L 12/26* (2006.01)
*H04L 12/931* (2013.01)
(Continued)

(52) U.S. Cl.
CPC ........ *H04L 12/2697* (2013.01); *H04L 43/0811* (2013.01); *H04L 43/50* (2013.01); *H04L 49/357* (2013.01); *H04L 49/555* (2013.01); *H04L 67/1097* (2013.01)

(58) Field of Classification Search
CPC ... H04L 41/069; H04L 41/22; H04L 41/5058; H04L 65/1033; H04L 12/2602; H04L 12/2692; H04L 43/00; H04L 43/0847; H04L 43/0864; H04L 43/10; H04L 43/16
USPC .......... 709/203, 223, 224, 238, 242; 370/241, 370/244, 248, 251
See application file for complete search history.

(56) References Cited

U.S. PATENT DOCUMENTS 6,005,863 A * 12/1999 Deng et al. ................. 370/392
6,397,360 B1   5/2002 Bruns
(Continued)

FOREIGN PATENT DOCUMENTS

| CN | 101222428 | 7/2008 |
| WO | 0040981 | 7/2000 |

OTHER PUBLICATIONS

Chinese Office Action dated Dec. 3, 2013 for CN101222428 filed Jul. 16, 2008.

(Continued)

*Primary Examiner* — Barbara Burgess
(74) *Attorney, Agent, or Firm* — David W. Victor; Konrad Raynes Davda & Victor LLP

(57) ABSTRACT

Provided are a computer program product, system, and method for supporting non-delivery notification between a switch and device in a network. A login with a switch is initiated including a test service parameter requesting a non-delivery notification service to cause the switch to return a non-delivery notification in response to a test path request indicating a destination node that is unavailable. Indication is made that the test service is available for the login in response to receiving a reply from the switch that the switch accepts the login with the non-delivery notification service. The test path request is sent to the switch to determine whether the destination node is available. The non-delivery notification is received from the switch in response to the switch determining that the destination node to which the test path request is directed is unavailable.

22 Claims, 4 Drawing Sheets

(51) Int. Cl.
*H04L 12/939* (2013.01)
*H04L 29/08* (2006.01)

(56) References Cited

U.S. PATENT DOCUMENTS

| | | | |
|---|---|---|---|
| 6,570,853 B1 | 5/2003 | Johnson et al. | |
| 6,609,165 B1* | 8/2003 | Frazier | 710/36 |
| 6,904,053 B1 | 6/2005 | Berman | |
| 7,035,923 B1* | 4/2006 | Yoakum et al. | 709/224 |
| 7,047,346 B2 | 5/2006 | Hodapp, Jr. | |
| 7,151,778 B2 | 12/2006 | Zhu et al. | |
| 7,388,843 B2 | 6/2008 | Fike et al. | |
| 7,529,823 B2* | 5/2009 | Trufinescu et al. | 709/223 |
| 7,551,612 B2* | 6/2009 | Kobayashi et al. | 370/368 |
| 7,668,984 B2 | 2/2010 | Gregg et al. | |
| 7,774,461 B2* | 8/2010 | Tanaka et al. | 709/224 |
| 2002/0188713 A1* | 12/2002 | Bloch et al. | 709/223 |
| 2004/0068561 A1* | 4/2004 | Yamamoto et al. | 709/224 |
| 2005/0018621 A1 | 1/2005 | Dropps et al. | |
| 2005/0036485 A1 | 2/2005 | Eilers et al. | |
| 2007/0171470 A1* | 7/2007 | Fujii et al. | 358/1.15 |
| 2011/0022729 A1 | 1/2011 | Eisenhauer et al. | |

OTHER PUBLICATIONS

Information Materials for IDS dated 122313, pp. 2, for CN101222428 filed Jul. 16, 2008.
U.S. Pat. No. 7,668,984 is the English language counterpart of Chinese patent CN101222428.
English Translation of Chinese patent CN101222428.
K. Malavalli, "Fibre Channel Classes of Service for Data Transport", Jan. 1997 [online] [retrieved on Jul. 7, 2005] http://www.brocadehongkong.com/download/resource/ClassofService.pdf, pp. 1-6, figures 2b, 4b, 6.
PCT International Search Report & Written Opinion dated Nov. 4, 2010 for Serial No. PCT/EP2010/059753, filed Jul. 7, 2010.
Office Action dated Apr. 20, 2011, pp. 1-14, for U.S. Appl. No. 12/508,490, entitled "Supporting Non-Delivery Notification Between a Switch and Device in a Network", by inventors D.G. Eisenhauer, R.G. Hathorn and L.W. Ricci (18.339).
Response dated Jul. 20, 2011, pp. 1-17, to Office Action dated Apr. 20, 2011, pp. 1-14, for U.S. Appl. No. 12/508,490, entitled "Supporting Non-Delivery Notification Between a Switch and Device in a Network", by inventors D.G. Eisenhauer, R.G. Hathorn and L.W. Ricci (18.339).
Office Action dated Oct. 14, 2011, pp. 1-11, for U.S. Appl. No. 12/508,490, entitled "Supporting Non-Delivery Notification Between a Switch and Device in a Network", by inventors D.G. Eisenhauer, R.G. Hathorn and L.W. Ricci (18.339).
Response dated Feb. 7, 2012, pp. 1-17, to Office Action dated Oct. 14, 2011, pp. 1-11, for U.S. Appl. No. 12/508,490, entitled "Supporting Non-Delivery Notification Between a Switch and Device in a Network", by inventors D.G. Eisenhauer, R.G. Hathorn and L.W. Ricci (18.339).
Notice of Allowance dated May 1, 2012 for U.S. Appl. No. 12/508,490, entitled "Supporting Non-Delivery Notification Between a Switch and Device in a Network", by inventors D.G. Eisenhauer, R.G. Hathorn and L.W. Ricci (18.339).

* cited by examiner

SUPPORTING NON-DELIVERY NOTIFICATION BETWEEN A SWITCH AND DEVICE IN A NETWORK

CROSS-REFERENCE TO RELATED APPLICATION

This application is a continuation of U.S. patent application Ser. No. 12/508,490, filed Jul. 23, 2009, which application is incorporated herein by reference in its entirety.

BACKGROUND OF THE INVENTION

1. Field of the Invention

The present invention relates to a method, system, and computer program product for supporting non-delivery notification between a switch and device in a network.

2. Description of the Related Art

In Fibre Channel Storage Area Networks (SAN), a Fibre Channel fabric may consist of several switches and interconnects between an Initiator (e.g. Server) Nx_Port and a Target Nx_Port (e.g. a storage device). When any physical Fibre Channel link in the path between two Nx_Ports fails or is taken off-line for a service action, reset, or other recovery action, the communicating Nx_Ports must be able to quickly determine the state of the entire communication path between them so that they can take action to fail and recover this communication path or begin using another available path before higher level applications or operating systems use a failed path and experience lengthy time-out recoveries.

A server or other device in a network may determine the state of a path to another node by sending a query frame. In Fibre Channel implementations, the device wanting to determine the state may send a PDISC Extended Link Service (ELS) request from a first Nx_Port to a second destination Nx_Port and use the response or lack of a response within a timeout time period to determine the state of the path. Alternatively, the device may send a query to the nameserver to determine if a target device has been deregistered from the nameserver because of a link failure or link off-line condition at the device. Each of these methods may be initiated upon the receipt of a Registered State Change Notification (RSCN) from the fabric which indicates a change in the state of the fabric which may affect communication from this device.

The Fibre Channel class 2 service provides information on the availability of devices by requiring acknowledged delivery of a frame or request and notification by the fabric to the requestor when a frame or request cannot be delivered. For instance, in the Fibre Channel class 2 service, if the request is sent from one Nx_Port to another Nx_Port and cannot be delivered to the target at any particular point in the fabric, the switch that could not deliver the request must send a Fabric Reject (F_RJT) or Fabric Busy (F_BSY) response to the requester. This gives the requester an immediate indication (within microseconds) that a part of the path has failed. The class 2 service may further be used to query the nameserver so that an immediate F_RJT or P_RJT (Port Reject) is received if the initiator is not currently logged into the fabric or the nameserver, respectively.

The Fibre Channel Class 2 service is expensive to implement in Fibre Channel switches and host bus adaptors and is not widely used by non-enterprise class Fibre Channel devices. More common is the use of the Fibre Channel class 3 service which does not require confirmed delivery notification. A class 3 query that could not be delivered would be dropped with no notification to the requester. In the Fibre Channel class 3 environment, a device wanting to determine the state of a Fibre Channel path must send a query to a destination node and wait for a timeout period to expire with no response to determine that the tested path to the destination node is unavailable. Waiting for a timeout period to determine the state of the path may not provide for timely determination of path failures. For instance, the requestor may have to not only wait for a timeout period that is in the order of 2-10 seconds, but in some implementations retry the query and time-out again before making a determination that the path has failed. This determination is not guaranteed to be accurate as the time-outs may have been caused by some other error or fabric congestion.

SUMMARY

Provided are a computer program product, system, and method for supporting non-delivery notification between a switch and device in a network. A login with a switch is initiated including a test service parameter requesting a non-delivery notification service to cause the switch to return a non-delivery notification in response to a test path request indicating a destination node that is unavailable. Indication is made that the test service is available for the login in response to receiving a reply from the switch that the switch accepts the login with the non-delivery notification service. The test path request is sent to the switch to determine whether the destination node is available in response to determining that the non-delivery notification service is available for the switch login. The non-delivery notification is received from the switch in response to the switch determining that the destination node to which the test path request is directed is unavailable.

Provided are a computer program product, system, and method for supporting non-delivery notification between a switch and device in a network. A login request is received from an adaptor including a test service parameter requesting a non-delivery notification service. Indication is made of the non-delivery notification service as available for the adaptor in response to determining that the non-delivery notification is supported. A test path request to the destination node is received from the adaptor. The test path request is forwarded to the destination node. A determination is made that the destination node to which the test path request is directed is unavailable. A determination is made as to whether the non-delivery notification service is available for the adaptor in response to determining that the destination node is unavailable. Non-delivery notification is sent to the adaptor for the destination node in response to determining that the non-delivery notification service is available for the adaptor.

DETAILED DESCRIPTION

Figure 1:
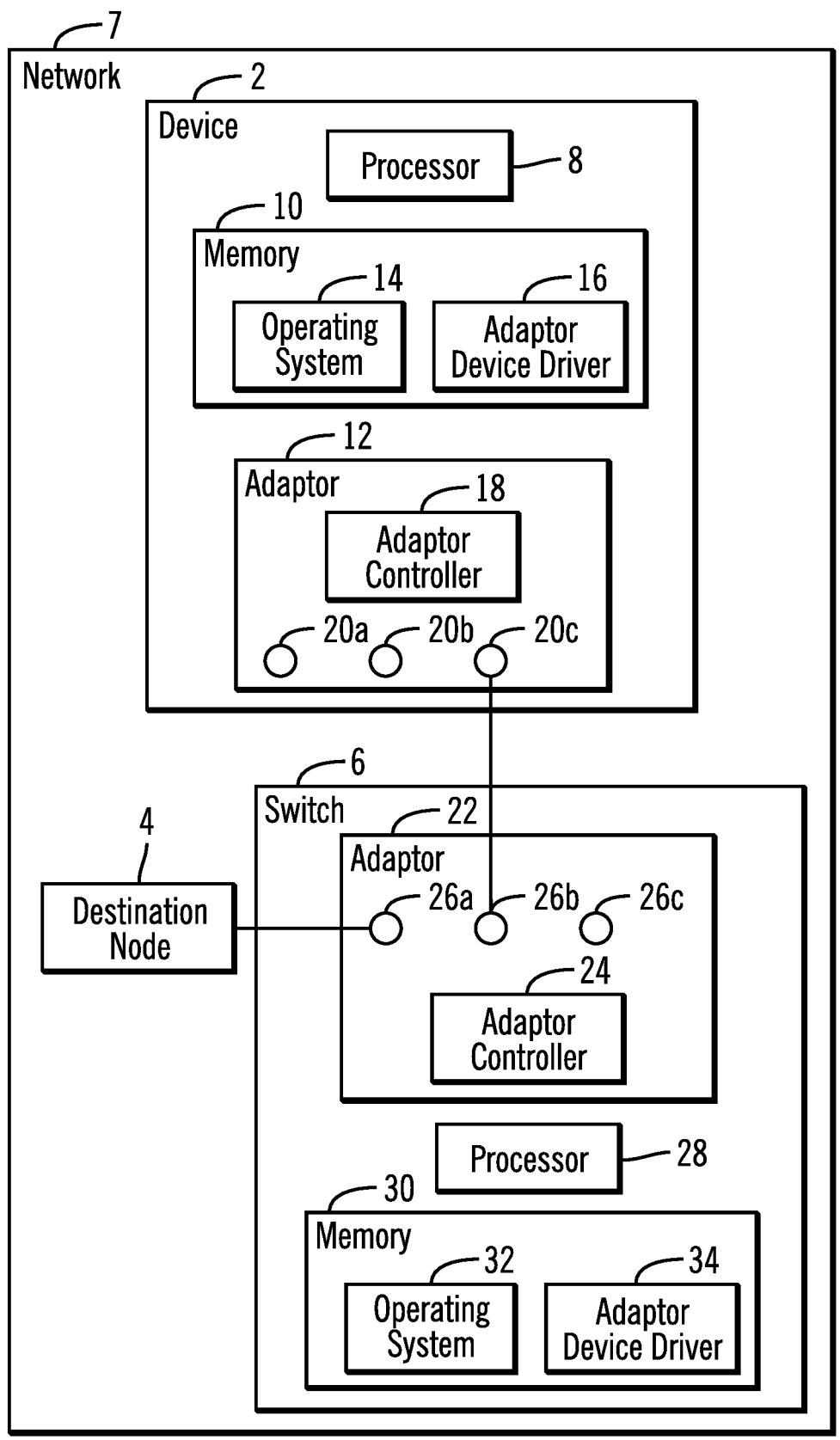
FIG. 1 illustrates an embodiment of a network computing environment.

FIG. 1 illustrates an embodiment where a device 2 connects to a destination node 4 via a switch 6 in a network 7. The device 2, destination node 4, and switch 6 may be part of a larger network 7 comprising one or more fabrics of switches, devices, and storage systems, such as a Storage Area Network (SAN), Local Area Network (LAN), Intranet, the Internet, Wide Area Network (WAN), wireless network, etc. The destination node 4 may send packets to other devices in the network 7 as well as receive packets. Further, the destination node 4 is representative of any device in the network 7 with which the device 2 may communicate.

The device 2 may include a processor 8, a memory 10, and an adaptor 12. The memory 10 includes an operating system 14 and an adaptor device driver 16 providing an interface between the device 2 operations and the adaptor 12 hardware. The adaptor 12 includes an adaptor controller 18 and one or more ports 20a, 20b, 20c, three are shown. The adaptor controller 18 manages the adaptor 12 and port 20a, 20b, 20c operations. The device 2 may comprise a host, storage device or other network component.

Switch 6 includes at least one adaptor 22 having an adaptor controller 24 to control adaptor 22 operations and one or more ports 26a, 26b, 26c to provide interconnections to devices in a network, such as a Fibre Channel Fabric. The switch 6 further includes a processor 28 and memory 30 having an operating system 32 and adaptor device driver 34 programs executed by the processor 28. The adaptor device driver 32 provides an interface between the switch components and the adaptor 22. Port 20c on the device 2 connects to port 26b on the switch adaptor 22 and switch port 26a connects to an adaptor (not shown) in the destination node 4. The switch 6 may include multiple adaptors having multiple ports to provide interconnectivity among devices in the network, including other switches, hosts, storage devices, etc.

The device 2 and switch 6 are shown as including processors 8, 28 that execute code. In alternative embodiments, the device 2 and switch 6 code and logic may be implemented in hardware devices. The memory devices 10, 30 may comprise volatile or non-volatile computer memory devices.

The devices 2, 6, 8 in the network may be connected in a switched fabric configuration. In alternative embodiments, the devices may be connected in an arbitrated loop or point-to-point configurations. In Fibre Channel implementations, the device 2 and destination node 4 may comprise Nx_ports. In certain implementations, the switch 6 may connect to the device 2 and destination node 4 using a class 3 Fibre Channel service in which the switch 6 would not automatically return acknowledgments of success or failure to connected devices sending packets to destination nodes through the switch.

Figure 2:
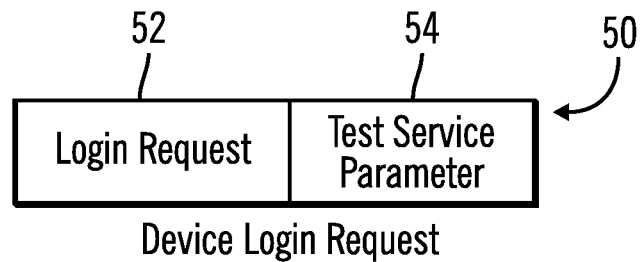
FIG. 2 illustrates an embodiment of a device login request.

FIG. 2 illustrates an embodiment of a device login request 50 that a device in the network 7, such as device 2, may submit to login and establish a session with the switch 6 to enable the device 2 to communicate with other devices in the network 7 connected directly or indirectly to the switch 6. The request 50 includes a login request parameter 52 and a includes a non-delivery notification (NDN) flag 54 in which the device 2 requests the switch 6 to provide a non-delivery notification if the device 6 sends a test path request that the switch 6 cannot deliver to the destination node 4. In Fibre Channel implementations, the device login request 50 including the NDN flag 54 may comprise a Fabric Login (FLOGI) Extended Link Service (ELS) request. The device 2 and switch 6 exchange the service parameters 54 to establish the non-delivery notification service in which the switch 6 confirms that non-delivery notifications will be provided with a test path request that cannot be delivered to the destination node.

In one Fibre Channel implementation, the NDN flag 54 may comprise a Non-Delivery Notification (NDN) service option within, for example, word 0 of the Class Service Parameter for Fibre Channel Class 3 service (such as word 0 bit 20, which is currently reserved) that indicates support for a new ELS service specifically stating support for the functionality that provides for immediate notification of the inability to deliver the frame. The switch 6 adaptor 24 may reply to the FLOGI with an LS_ACC (Link Services Accept) indicating NDN support in the Service Options word of the Class 3 Service Parameters to indicate that the entire Fabric 7 has support for this new function. Switches Interconnected through Inter-switch Links (ISLs) could determine support for this function in connected switches, by defining, for example, a new bit in the Class 3 Interconnect Port Parameters that are exchanged using the Establish Link Parameters (ELP) inter-switch link service.

In Fibre Channel implementations, the switch 6 may discard the test path request and when the NDN service is supported return a non-delivery notification in the form of a F_RJT (Fabric Reject) Fibre Channel Link Control frame or an LS_RJT (Link Service Reject) ELS Reply sequence. The non-delivery notification may contain a reason code indicating the reason that the test path request frame could not be delivered (such as destination port off-line, destination not logged in, source not logged in, etc).

In alternative embodiments, such as non-Fibre Channel implementations or other types of Fibre Channel implementations, different words, parameters and other protocols may be used to establish support for the non-delivery notification during login.

Figure 3:
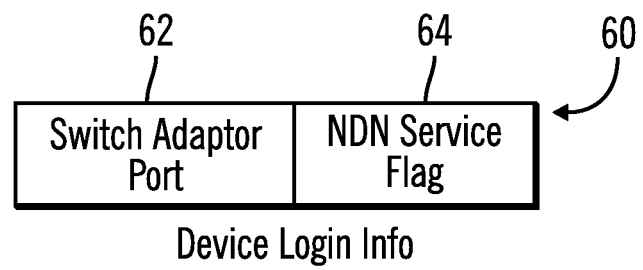
FIG. 3 illustrates an embodiment of device login information.

FIG. 3 illustrates an embodiment of device login information 60 the device 2 maintains to indicate a switch adaptor port 52, e.g., ports 26a, 26b, 26c, and a non-delivery notification (NDN) flag 64 indicating whether non-delivery notifications are provided for a test path request sent to the identified switch port 52. The device login information 60 may be maintained by the adaptor device driver 16, adaptor controller 18 and/or other device 2 code.

Figure 4:
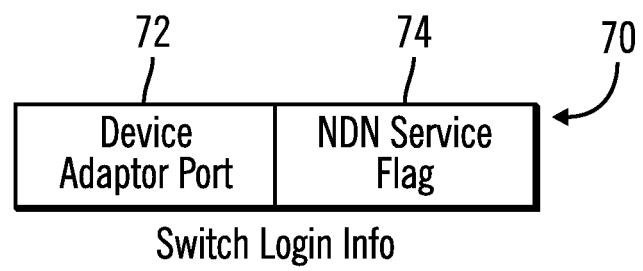
FIG. 4 illustrates an embodiment of switch login information.

FIG. 4 illustrates an embodiment of switch login information 70 the switch 6 maintains to indicate a device adaptor port 72, e.g., ports 20a, 20b, 20c, and a non-delivery notification (NDN) flag 74 indicating whether non-delivery notifications are provided for a test path request from the identified device port 72. The switch device login information 70 may be maintained by the adaptor device driver 34, the adaptor controller 24, and or other switch 6 code.

Figure 5:
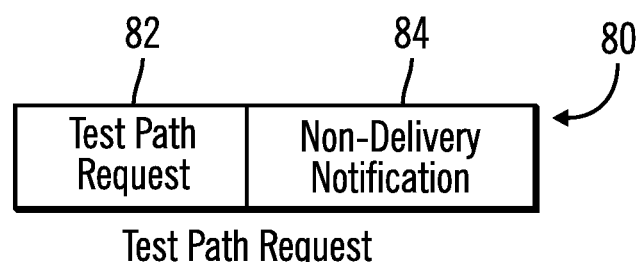
FIG. 5 illustrates an embodiment of a test path request.

FIG. 5 illustrates an embodiment of a test path request 80 that the device adaptor 12 sends to the destination node 4 via the switch 6 in response to receiving a state change notification for the destination node 4, which includes a test path request parameter 82 identifying the message as a test path request and a non-delivery notification flag 8 to signal the switch 6 to provide a non-delivery notification upon detecting that the destination node is not responding to the test path request. In this way, the switch 6 is signaled to provide a non-delivery request even if the switch adaptor 22 and device adaptor 12 communicate using a protocol, such as the Fibre Channel class 3 service, which does not provide for non-delivery notifications to requests.

Figure 6:
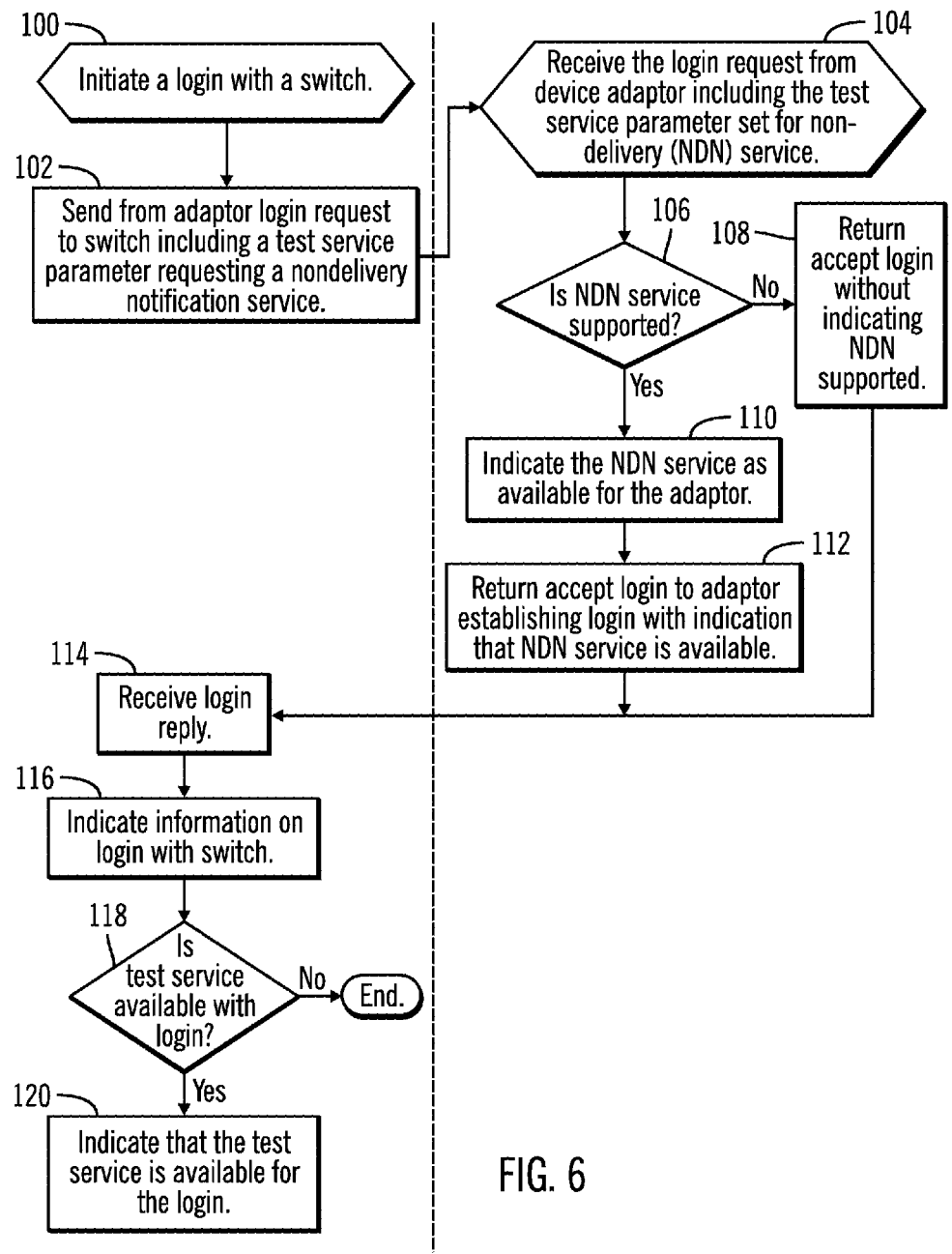
FIG. 6 illustrates an embodiment of operations performed within a device and switch to establish a login with a non-delivery notification service between the switch and the device.

FIG. 6 illustrates an embodiment of operations performed in the device 2 and switch 6, specifically in the adaptor device driver 16, 34 and/or adaptor controller 18, 24 of the device 2 and switch 6 to initiate a login between the device adaptor 12 and switch adaptor 22 to provide for the test path request non-delivery notification. Operations 100, 102, 114, 116, 118, and 120 may be performed by the device adaptor controller 12 and/or adaptor device driver 16 and operations 104, 106, 108, 110, and 112 may be performed by the switch adaptor controller 24 and/or adaptor device driver 34. The device adaptor device driver 16 and/or adaptor controller 18 initiates (at block 100) a login with the switch 6 by sending (at block 102) the device login request 50 with the test service parameter 54 requesting non-delivery notification for a test path request. Upon receiving (at block 104) the login request 50 from device adaptor 12 including the test service parameter 54 set to request non-delivery notification, the switch adaptor controller 24 and/or device driver 34 handling the login determines (at block 106) whether the non-delivery notification service (NDN) is supported. If (at block 106) the NDN service is not supported, then the switch adaptor controller 24 and/or device driver 34 returns (at block 108) accept to the login without indicating that the NDN service is supported. If (at block 106) the NDN service is supported, then the switch adaptor controller 24 and/or device driver 34 indicates (at block 110) the NDN service as available for the adaptor port 20c on which the login was received. This indication may be made by creating switch login information 70 (FIG. 4) that identifies the device adaptor port 20c in field 72 and sets the non-delivery notification service 74 flag to indicate the NDN service as supported. If the NDN service is supported, then accept login is returned (at block 112) to the device adaptor port establishing a login and session with indication that the NDN service is available.

Upon receiving (at block 114) a reply to the login request, the device adaptor controller 18 and/or device driver 16 indicates device login information 60 identifying the switch port 26b in field 62 (FIG. 3) for which the login was established and indicating whether the non-delivery notification service is supported in field 74, which depends on whether the switch reply to the login indicates that the NDN service is supported.

Figure 7:
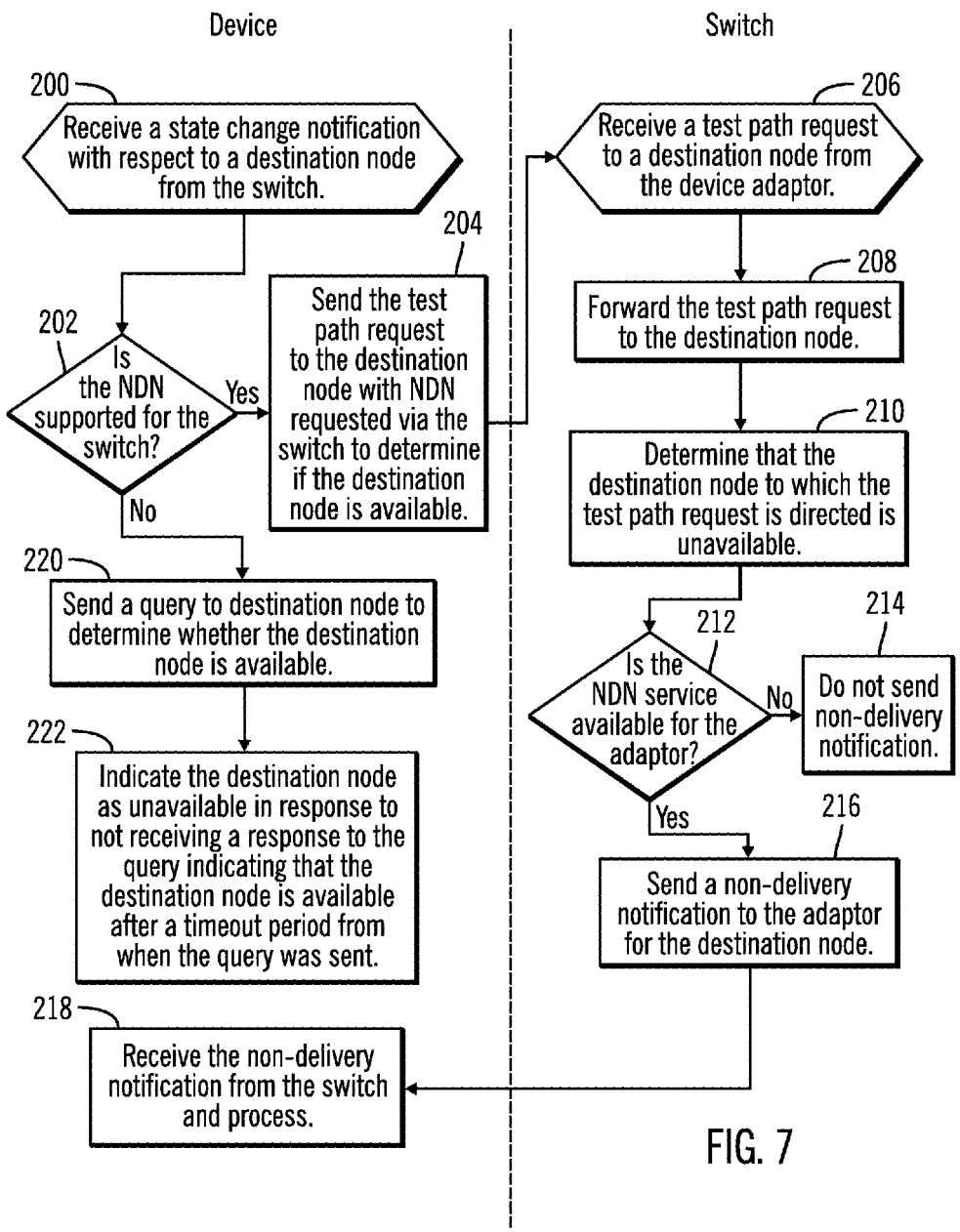
FIG. 7 illustrates an embodiment of operations performed within a device and a switch to use a non-delivery notification service to determine the availability of a destination node.

FIG. 7 illustrates an embodiment of operations performed in the device 2 and switch 6, specifically in the adaptor device driver 16, 34 and/or adaptor controller 18, 24 of the device 2 and switch 6 when the device adaptor 12 is determining whether a destination node 4 is available. Operations 200, 202, 204, 218, 220, and 222 may be performed by the device adaptor controller 12 and/or adaptor device driver 16 and operations 206, 208, 210, 212, 214, and 216 may be performed by the switch adaptor controller 24 and adaptor device driver 34. Upon the device adaptor device driver 16 and/or adaptor controller 18 receiving (at block 200) a state change notification with respect to a destination node from the switch 6, the device adaptor device driver 16 and/or adaptor controller 18 determines whether the NDN service is supported for the switch adaptor 24 from which the state change notification was sent. The determination may be made by processing the device login information 60 for the switch to determine if the NDN service flag 74 for the switch port identified in field 72 indicates that NDN service is supported. If (at block 202) the NDN service is supported for the switch port 26b upon which the state change notification is received, then the device adaptor device driver 16 and/or adaptor controller 18 sends (at block 204) the test path request 80 (FIG. 5) to the destination node 4 with the non-delivery notification parameter 84 set to request the NDN service to determine if the destination node 4 is available.

Upon receiving the test path request to the destination node 4 from the device adaptor 12, the switch adaptor device driver 34 and/or adaptor controller 24 forwards (at block 208) the test path request to the destination node 4. In response to determining (at block 210) that the destination node 4 to which the test path request 80 is directed is unavailable, the switch adaptor device driver 34 and/or adaptor controller 24 determines (at block 212) whether the non-delivery notification (NDN) service is available for the adaptor 12 that initiated the test path request 80. This may be determined by processing the switch login information 70 (FIG. 4) for the device port 20a, 20b, 20c, which initiated the test path request, identified in field 72 to determine whether the NDN flag 74 indicates that the non-delivery notification is supported. If (at block 212) the NDN service is not supported for the device adaptor 12 sending the test request, then non-delivery notification is not sent (at block 214) to the device adaptor 12 and control ends. Otherwise, if (at block 212) the NDN service is supported, then the switch adaptor device driver 34 and/or adaptor controller 24 sends (at block 216) a non-delivery notification (NDN) to the adaptor 12 initiating the test path request providing information on the non-delivery to the destination node. The switch adaptor device driver 34 and/or adaptor controller 24 may discard the test path request. In certain embodiments, the NDN notification may include a code indicating reason for the non-delivery to the destination node 4, such as indicating that the destination node 4 may have been taken off-line for a service action, reset, or other recovery action, etc. The device adaptor controller 18 and/or adaptor device driver 16 may then process the non-delivery notification to take action, such as rerouting requests to the destination node 4 down a different path or quiescing requests to the destination node 4. The device adaptor 12 may take action to fail and recover the path on which the non-delivery notification was received or begin using another available path before higher level applications or operating systems using the path begin lengthy time-out recoveries.

If (at block 202) the device adaptor controller 18 and/or adaptor device driver 16 determines that the NDN service is not supported for the switch adaptor port 26b providing the state change notification, then the device adaptor controller 18 and/or adaptor device driver 16 may send (at block 220) a query to the destination node 4 to determine whether the destination node 4 is available. The device adaptor controller 18 and/or adaptor device driver 16 indicates (at block 222) the destination node as unavailable in response to not receiving a response to the query indicating that the destination node is available after a timeout period from when the query was sent. If the non-delivery notification service is not supported, then the switch 6 will not return a non-delivery notification if the switch 6 determines that the destination node 4 is unavailable or not responding.

The switch operations of FIG. 7 may be performed by any intermediary switch between the switch 6 and the destination node 4 to return the non-delivery notification to the previous switch or other entity that forwarded the test path request to the intermediary switch. For instance, if any switch that receives the test path request cannot deliver the test path request to the destination node 4 or the next intermediary entity in the fabric 6, then that intermediary switch or entity may discard the test path request and send the non-delivery notification to the previous entity that forwarded the request, which can be another switch or the initiating device 6. In this way, each intermediary entity between the destination node 4 and the device 2 performs the operations of FIG. 7 to return NDN notification to the previous entity to eventually reach the device 2.

In the described embodiments, the operations of FIG. 7 are performed in response to the device 6 receiving a state change notification. In alternative embodiments, the operations may be performed in response to an event other than a state change notification.

The operations in FIGS. 6 and 7 are performed when the switch and device adaptors communicate according to a protocol where the switch adaptor 22 does not generally provide acknowledgments of delivery success or delivery failure to the device 4, such as is the case in the Fibre Channel class 3 service. The described embodiments provide a technique for the switch adaptor to support a non-delivery notification service for a protocol that does not otherwise provide delivery or non-delivery acknowledgments.

In an alternative embodiment, an alternative to the sending of the test path request to the destination, the device 2 may send the test path request to a fabric controller, which may be implemented in the switch 6 or comprise a separate component in the network. In such embodiments, the fabric controller determines the state of the destination port through use of a nameserver or some other means of determining the state of the path to the destination node 4. This has the advantage of avoiding snooping of a particular test path request and having to create a response at a port that is not the destination of the request. In one implementation, the fabric controller may provide the result on the status of the destination node in an LS-ACC response.

In certain fabric controller implementations, the device 2 may send the request to the fabric controller via the switch 6, and if the fabric controller is implemented external to the switch 6, the switch 6 may then forward the test request to the fabric controller and then return the response from the fabric controller in the form of a non-delivery notification. If the fabric controller is implemented within the switch 6, then the switch 6 would return the non-delivery notification to the device 2.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for communicating with a switch and destination node, the computer program product comprising a non-transitory computer readable storage device having computer readable program code embodied therein that executes to perform operations, the operations comprising:
   initiating a login with the switch including a test service parameter requesting a non-delivery notification service to cause the switch to return a non-delivery notification in response to a test path request indicating that the destination node is unavailable;
   indicating that the non-delivery notification service is available for the login in response to receiving a reply from the switch that the switch accepts the login with the non-delivery notification service;
   sending the test path request to the switch to determine whether the destination node is available in response to determining that the non-delivery notification service is available for the login with the switch; and
   receiving the non-delivery notification from the switch in response to the switch determining that the destination node to which the test path request is directed is unavailable.

2. The computer program product of claim 1, wherein the test path request is sent to the destination node via the switch.

3. The computer program product of claim 2, wherein the computer program product is implemented in a device connected to the switch in a fabric, wherein the test path request includes a non-delivery notification parameter requesting any forwarder, including the switch, unable to deliver the test path request to the destination node to return the non-delivery notification to the switch or a next intermediary entity between the device and the forwarder.

4. The computer program product of claim 1, wherein the operations further comprise:
   sending a query to determine whether the destination node is available in response to determining that the non-delivery notification service is not available; and
   indicating the destination node as unavailable in response to not receiving a response to the query indicating that the destination node is available after a timeout period from when the query was sent.

5. The computer program product of claim 1, wherein the login requesting the non-delivery notification service is initiated as part of a Fibre Channel class 3 service.

6. The computer program product of claim 1, wherein the test path request is sent to a fabric controller via the switch, wherein the fabric controller determines whether the destination node is available, wherein the fabric controller returns the non-delivery notification for the destination node, and wherein the non-delivery notification is received from the fabric controller via the switch.

7. A computer program product for communicating with an adaptor and a destination node, the computer program product comprising a non-transitory computer readable storage device having computer readable program code embodied therein that executes to perform operations, the operations comprising:
   receiving a login request from the adaptor including a test service parameter requesting a non-delivery notification service;
   indicating the non-delivery notification service as available for the adaptor in response to determining that the non-delivery notification is supported;
   receiving a test path request to the destination node from the adaptor;

forwarding the test path request to the destination node;
determining that the destination node to which the test path request is directed is unavailable;
determining whether the non-delivery notification service is available for the adaptor in response to determining that the destination node is unavailable; and
sending a non-delivery notification to the adaptor for the destination node in response to determining that the non-delivery notification service is available for the adaptor.

8. The computer program product of claim 7, wherein the operations further comprise:
not sending the non-delivery notification to the adaptor indicating the unavailability of the destination node in response to determining that the non-delivery notification is unavailable for the adaptor.

9. The computer program product of claim 7, wherein the computer readable program code implements a Fibre Channel class 3 protocol, wherein the non-delivery notification service is supported in the Fibre Channel class 3 protocol.

10. A system in communication with a switch and a destination node, comprising:
an adaptor for communicating with the switch and the destination node, wherein the adaptor executes operations, the operations comprising:
initiating a login with the switch including a test service parameter requesting a non-delivery notification service to cause the switch to return a non-delivery notification in response to a test path request indicating that the destination node is unavailable;
indicating that the non-delivery notification service is available for the login in response to receiving a reply from the switch that the switch accepts the login with the non-delivery notification service;
sending the test path request to the switch to determine whether the destination node is available in response to determining that the non-delivery notification service is available for the login with the switch; and
receiving the non-delivery notification from the switch in response to the switch determining that the destination node to which the test path request is directed is unavailable.

11. The system of claim 10, wherein the test path request is sent to the destination node via the switch.

12. The system of claim 11, wherein the adaptor connects to the switch in a fabric, wherein the test path request includes a non-delivery notification parameter requesting any forwarder, including the switch, unable to deliver the test path request to the destination node to return the non-delivery notification to the switch or a next intermediary entity between the device and the forwarder.

13. The system of claim 10, wherein the operations further comprise:
sending a query to determine whether the destination node is available in response to determining that the non-delivery notification service is not available; and
indicating the destination node as unavailable in response to not receiving a response to the query indicating that the destination node is available after a timeout period from when the query was sent.

14. The system of claim 10, wherein the login requesting the non-delivery notification service is initiated as part of a Fibre Channel class 3 service.

15. The system of claim 10, wherein the test path request is sent to a fabric controller via the switch, wherein the fabric controller determines whether the destination node is available, wherein the fabric controller returns the non-delivery notification for the destination node, and wherein the non-delivery notification is received from the fabric controller via the switch.

16. A switch in communication with a device adaptor and a destination node, comprising:
a switch adaptor for communicating with the device adaptor and the destination node, wherein the adaptor executes operations, the operations comprising:
receiving a login request from the device adaptor including a test service parameter requesting a non-delivery notification service;
indicating the non-delivery notification service as available for the device adaptor in response to determining that the non-delivery notification is supported;
receiving a test path request to a destination node from the device adaptor;
forwarding the test path request to the destination node;
determining that the destination node to which the test path request is directed is unavailable;
determining whether the non-delivery notification service is available for the device adaptor in response to determining that the destination node is unavailable; and
sending a non-delivery notification to the device adaptor for the destination node in response to determining that the non-delivery notification service is available for the device adaptor.

17. The switch of claim 16, wherein the operations further comprise:
not sending the non-delivery notification to the device adaptor indicating the unavailability of the destination node in response to determining that the non-delivery notification is unavailable for the device adaptor.

18. The switch of claim 16, wherein the switch adaptor implements a Fibre Channel class 3 protocol, wherein the non-delivery notification service is supported in the Fibre Channel class 3 protocol.

19. A method implemented in a computer device, comprising:
initiating, at the computer device, a login with a switch including a test service parameter requesting a non-delivery notification service to cause the switch to return a non-delivery notification in response to a test path request indicating that a destination node is unavailable;
indicating that the non-delivery notification service is available for the login in response to receiving a reply from the switch that the switch accepts the login with the non-delivery notification service;
sending the test path request to the switch to determine whether the destination node is available in response to determining that the non-delivery notification service is available for the login with the switch; and
receiving the non-delivery notification from the switch in response to the switch determining that the destination node to which the test path request is directed is unavailable.

20. The method of claim 19, wherein the test path request is sent to the destination node via the switch.

21. The method of claim 20, wherein the computer implemented method is implemented in a device connected to the switch in a fabric, wherein the test path request includes a non-delivery notification parameter requesting any forwarder, including the switch, unable to deliver the test path request to the destination node to return the non-delivery notification to the switch or a next intermediary entity between the device and the forwarder.

22. The method of claim 19, further comprising:
sending a query to determine whether the destination node is available in response to determining that the non-delivery notification service is not available; and
indicating the destination node as unavailable in response to not receiving a response to the query indicating that the destination node is available after a timeout period from when the query was sent.

\* \* \* \* \*